(12) United States Patent
Grandhee

(10) Patent No.: US 6,683,145 B2
(45) Date of Patent: Jan. 27, 2004

(54) HYDROPHOBIC LATTICES AND COATING COMPOSITIONS CONTAINING THEM

(75) Inventor: Sunitha Grandhee, Novi, MI (US)

(73) Assignee: BASF Corporation, Southfield, MI (US)

(*) Notice: Subject to any disclaimer, the term of this patent is extended or adjusted under 35 U.S.C. 154(b) by 0 days.

(21) Appl. No.: 10/039,721

(22) Filed: Oct. 26, 2001

(65) Prior Publication Data

US 2003/0105215 A1 Jun. 5, 2003

(51) Int. Cl.[7] ............................................. C08F 218/14
(52) U.S. Cl. ...................... 526/307.7; 526/78; 526/79; 526/80; 526/307.4; 526/318; 526/319; 524/501; 524/591; 525/162; 428/461; 428/463; 428/520; 427/388.4
(58) Field of Search ................................. 524/501, 591; 526/78, 79, 80, 307.4, 307.7, 318, 319; 428/463, 461, 520; 525/162; 427/388.4

(56) References Cited

U.S. PATENT DOCUMENTS

| | | | |
|---|---|---|---|
| 3,787,519 A | 1/1974 | Vasta | 260/834 |
| 4,808,656 A | 2/1989 | Kania et al. | 524/512 |
| 5,214,086 A * | 5/1993 | Mormile et al. | 524/237 |
| 5,569,715 A | 10/1996 | Grandhee | 525/7 |
| 5,786,420 A | 7/1998 | Grandhee | 525/7 |
| 5,854,332 A * | 12/1998 | Swarup et al. | 524/507 |
| 5,866,259 A | 2/1999 | Harris et al. | 428/424.4 |
| 5,969,030 A | 10/1999 | Grandhee | 524/457 |
| 6,025,031 A * | 2/2000 | Lettmann et al. | 427/388.4 |
| 6,087,444 A * | 7/2000 | Swarup et al. | 525/123 |
| 6,270,905 B1 * | 8/2001 | Swarup et al. | 428/463 |

FOREIGN PATENT DOCUMENTS

| | | | |
|---|---|---|---|
| EP | 0 635 523 | 7/1994 | C08F/220/32 |
| FR | 2 182 896 | 3/1973 | C08F/1/06 |
| GB | 1330266 | 3/1972 | C08F/220/28 |

OTHER PUBLICATIONS

International Search Report PCT/US 02/27077 filed Sep. 8, 2002.

* cited by examiner

Primary Examiner—Tatyana Zalukaeva

(57) ABSTRACT

A coating composition containing an emulsion polymer prepared with up to about 20% by weight, based on total polymerizable monomers, of addition polymerizable esters of the glycidyl esters of tertiary acids having 9 or more carbon atoms, preferably up to 18 carbon atoms, and particularly having 9 to 11 carbon atoms has improved application properties and produces coatings with better appearance and less water sensitivity. The emulsion polymerization process of the invention produces less coagulum without having to increase the amount of surfactant.

11 Claims, No Drawings

HYDROPHOBIC LATTICES AND COATING COMPOSITIONS CONTAINING THEM

FIELD OF THE INVENTION

This invention relates to latex polymer dispersions and coating compositions containing such lattices, particularly automotive coatings.

BACKGROUND OF THE INVENTION

Increasing environmental concerns initiated an evolution in the automotive coatings industry in the last decades of the twentieth century. The push towards zero volatile organic compound-containing coatings brought more reliance on polymerization techniques limiting use of organic solvents, such as aqueous emulsion polymerization. Emulsion polymerization is carried out by addition polymerization of generally hydrophobic monomer in micelles stabilized by a surfactant in the water. The resulting polymer dispersion is referred to as a latex.

Common variations of the emulsion polymerization process include one-step (batch) and two-step polymerization techniques. In the one-step technique, all the monomers are combined and polymerized in a single step. In the two-step technique, two distinct monomer compositions are added sequentially, forming a first polymer and then polymerizing a second polymer in the presence of the first polymer. The product of the two-step emulsion polymer may be termed a two-stage polymer. A two-stage emulsion polymer offers more opportunity to tailor the emulsion particle properties as well as the properties of the coating obtained form the coating composition.

Coating compositions may be formulated with emulsion polymers, whether one-stage or two-stage, to achieve lower volatile organic content. Automotive coatings must meet rigorous performance requirements, and the polymer and other vehicle components must be able to provide the necessary application characteristics and film properties, including the rheology to achieve excellent appearance. It is important for the cured coating layers to provide a smooth surface so that the vehicle finish will have a mirror-like quality. One problem that has been encountered for automotive coatings made with emulsion polymers has been sagging when the composition is applied to the vehicle. Sagging causes unacceptable distortions of the vehicle finish.

It is believed that increased polymer hydrophobicity will reduce or eliminate sagging by increasing the rate of water release when the coating composition is applied by air-atomized spraying onto the vehicle. If the coating composition contains less water by the time it reaches the vehicle surface, then it will form a coating layer with less tendency to sag. It has been found that more hydrophobic monomers are more difficult to emulsify than more hydrophilic monomers. Mini-emulsion and micro-emulsion techniques, which use shear to form very small monomer droplets, have been employed for emulsion polymerization of more hydrophobic monomer mixtures. These techniques are explained in more detail in U.S. Pat. Nos. 5,969.030, 5,786,420, and 5,569,715, incorporated herein by reference. The mini-emulsion technique provides droplets in the range of 50 to 500 nanometers, while the micro-emulsion technique uses a co-surfactant to achieve monomer droplets in the range of 50 to 100 nm.

While the mini- and micro-emulsion techniques can produce more hydrophobic lattices, the increase in cost is substantial. The equipment for providing the high shear necessary to form the small droplet sizes of mini- and micro-emulsion is much more expensive than traditional emulsion polymerization equipment. The larger amount of surfactant and co-surfactant used in mini-emulsion and micro-emulsion techniques increase the cost of the emulsion polymer even more. Additionally, the added equipment and processing increases the opportunity for coagulum to form. Coagulum is a problem for a number of reasons. Coagulum must be filtered from the product polymer because the coagulated particles will cause imperfections in the coating layer. Coagulum reduces usable product. Coagulum also collects in the equipment so that eventually production must be stopped and the equipment cleaned, which is even more of a problem in mini- and micro-emulsion polymerizations because of additional equipment to clean.

It would be desirable, therefore, to have a method of preparing a more hydrophobic emulsion polymer that would not require the high shear and high surfactant/co-surfactant content necessary for the mini-emulsion and micro-emulsion techniques.

SUMMARY OF THE INVENTION

The invention provides a hydrophobic emulsion polymer prepared with up to about 20% by weight, based on total polymerizable monomers, of addition polymerizable esters of the glycidyl esters of tertiary acids having 9 or more carbon atoms, preferably up to 18 carbon atoms, and particularly having 9 to 11 carbon atoms. The emulsion polymerization process of the invention produces less coagulum without having to increase the amount of surfactant.

While "emulsion" generally refers to a liquid-in-liquid stable suspension and "dispersion" to a solid-in-liquid stable suspension, the products of emulsion polymerization have traditionally been called "emulsions" or "emulsion polymers" regardless of whether their glass transition temperature is such that they are in fact solids. "Emulsion" or "dispersion" will be used interchangeably to refer to dispersions and emulsions.

The invention further provides a coating composition containing the hydrophobic emulsion polymer described. The coating composition also provides better handling properties and better appearance (e.g., improved resistance to pinholing) because of its quicker release of water during application to the substrate.

The invention still further provides a coating formed by applying the coating composition to a substrate and, optionally, curing the applied coating to form a cured coating, and a composite coating having at least one layer formed by applying and optionally curing the coating composition of the invention. The coating composition advantageously contains less surfactant that would tend to increase water sensitivity in the coating prepared from it. The coating also has improved impact resistance and chip resistance.

DETAILED DESCRIPTION OF THE PREFERRED EMBODIMENTS

The following description of the preferred embodiment(s) is merely exemplary in nature and is in no way intended to limit the invention, its application, or uses.

Specific preferred addition polymerizable esters of the glycidyl esters of tertiary acids having 9 or more carbon atoms may be represented by the formula:

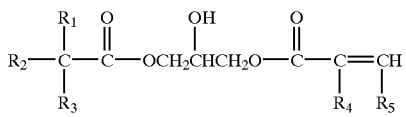

in which $R_1$, $R_2$, and $R_3$ are alkyl groups, preferably at least one of which is methyl, having a total of at least 8 carbon atoms, preferably up to about 16 carbon atoms preferably from 8 carbons to about 10 carbon atoms; and $R_4$ and $R_5$ are either both H or one of $R_4$ and $R_5$ is a methyl group and the other is H.

In one preferred embodiment, the polymerizable ester is the condensation product of a polymerizable acid and glycidyl esters of a mixture of tertiary acids having 9 to 11 carbon atoms having at least one methyl group on the α-carbon (e.g., $R_1$, $R_2$, and $R_3$ of the above structure are alkyl groups having a total of from 8 carbons to 10 carbon atoms. at least one of which is a methyl group). Mixtures of tertiary acids having 9 to 11 carbon atoms having at least one methyl group on the α-carbon are available under the trademark VERSATIC® acid, and the glycidyl ester of VERSATIC® acid (also commonly called neodecanoic acid) is available under the brand name CARDURA™ Resin E-10 from Resolution Performance Products, Houston, Tex. Examples of polymerizable acids include, without limitation, acrylic acid, methacrylic acid, and crotonic acid. The glycidyl esters may also be reacted with fumaric, maleic, and itaconic anhydrides, fumaric, maleic, and itaconic acids, and monoalkyl esters of these acids.

The emulsion polymer preferably includes crosslinkable functionality such as, without limitation, active hydrogen groups, oxirane groups, carbodiimide groups, and acetoacetoxy groups. The emulsion polymer may be polymerized from a monomer mixture that includes an active hydrogen-functional monomer and, when the active hydrogen-functional monomer is not an acid-functional monomer, preferably also includes an acid-functional monomer. Examples of active hydrogen-functional monomers include, without limitation, hydroxyl-functional monomers such as hydroxyethyl acrylate, hydroxyethyl methacrylate, hydroxypropyl acrylate, hydroxypropyl methacrylate, hydroxybutyl acrylates, and hydroxybutyl methacrylates; acid-functional monomers including acrylic acid, methacrylic acid, and crotonic acid; and carbamate- and urea-functional monomers or monomers with functional groups that are converted to carbamate or urea groups after polymerization such as, without limitation, those disclosed in U.S. Pat. No. 5,866,259, "Primer Coating Compositions Containing Carbamate-Functional Acrylic Polymers," the entire disclosure of which is incorporated herein by reference. Examples of other monomers that can be used to provide crosslinkable functionality include, without limitation, glycidyl acrylate, glycidyl methacrylate, acetoacetoxybutyl methacrylate, acetoacetoxyethyl acrylate, and carbodiimide methacrylate. Preferably, a sufficient amount of active hydrogen-functional monomer is included to produce an equivalent weight of 1000 or less grams per equivalent, more preferably 800 or less grams per equivalent, and even more preferably 600 or less grams per equivalent.

In one preferred embodiment, the emulsion polymer forms an anionic dispersion. Examples of suitable acid-functional monomers include, without limitation, α,β-ethylenically unsaturated monocarboxylic acids containing 3 to 5 carbon atoms, α,β-ethylenically unsaturated dicarboxylic acids containing 4 to 6 carbon atoms and the anhydrides and monoesters of these. Examples include, without limitation, acrylic acid, methacrylic acid, crotonic acid, maleic acid or maleic anhydride, itaconic acid or itaconic anhydride, and so on. A sufficient amount of acid-functional monomer is included to produce an emulsion polymer with an acid number of at least about 1, and preferably the emulsion polymer has an acid number of from about 1 to about 10.

In addition to the one or more polymerizable esters of glycidyl esters of tertiary acids, one or more other ethylenically unsaturated monomers are employed as comonomers in forming the emulsion polymers of the invention. Examples of such copolymerizable monomers include, without limitation, derivatives of α,β-ethylenically unsaturated monocarboxylic acids containing 3 to 5 carbon atoms, including esters, nitriles, or amides of those acids; diesters of α,β-ethylenically unsaturated dicarboxylic acids containing 4 to 6 carbon atoms; vinyl esters, vinyl ethers, vinyl ketones, vinyl amides, and aromatic or heterocyclic aliphatic vinyl compounds. Representative examples of acrylic and methacrylic acid amides and aminoalkyl amides include, without limitation, such compounds as acrylamide, N-(1,1-dimethyl-3-oxobutyl)-acrylamide, N-alkoxy amides such as methylolamides; N-alkoxy acrylamides such as n-butoxy acrylamide; N-aminoalkyl acrylamides or methacrylamides such as aminomethylacrylamide, 1-aminoethyl-2-acrylamide, 1-aminopropyl-2-acrylamide, 1-aminopropyl-2-methacrylamide, N-1-(N-butylamino)propyl-(3)-acrylamide and 1-aminohexyl-(6)-acrylamide and 1-(N,N-dimethylamino)-ethyl-(2)-methacrylamide, 1-(N,N,-dimethylamino)-propyl-(3)-acrylamide and 1-(N,N-dimethylamino)-hexyl-(6)-methacrylamide.

Representative examples of esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates; and polyalkylene glycol acrylates and methacrylates.

Representative examples of vinyl monomers that can be copolymerized include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone.

Representative examples of other ethylenically unsaturated polymerizable monomers include, without limitation, such compounds as fumaric, maleic, and itaconic anhydrides (which would provide acid functionality in the emulsion polymer), monoesters (also providing acid functionality), and diesters. Polyfunctional monomers may also be included to provide a partially crosslinked dispersion. Examples of polyfunctional compounds include, without limitation, ethylene glycol diacrylate, ethylene glycol dimethacrylate, triethylene glycol diacrylate, tetraethylene glycol dimethacrylate, 1,4-butanediol diacrylate and dimethacrylate, 1,6-hexanediol diacrylate and dimethacrylate, divinylbenzene, trimethylolpropane triacrylate and trimethacrylate, pentaerythritol tetaacrylate and tetramethacrylate, and so on.

The monomers may be emulsion polymerized in a single-stage or two-stage polymerization according to well-known methods. In a two-stage polymerization, the first stage monomers are added and polymerized first in the aqueous medium, followed by addition and polymerization of the second stage monomers. The aqueous medium may contain a portion of organic solvent, but preferably less than about 5% of the aqueous medium is organic solvent, and preferably no organic solvent is included in the aqueous medium. Suitable examples of water-miscible organic solvent include, without limitation, esters, alkylene glycol ethers, alkylene glycol ether esters, lower molecular weight aliphatic alcohols, and so on.

Ionic or amphoteric surfactants, such as sodium lauryl sulfate, nonionic surfactants based on polyethoxylated alcohols or polyethoxy-polyalkoxy block copolymers, polyoxyethylenenonylphenyl ethers, polyoxyethylenealkylallyl ether sulfuric acid esters, amino and alkali salts of dodecylbenzenesulfonic acid such as the dimethylethanolamine salt of dodecylbenzenesulfonic acid and sodium dodecylbenzenesulfonic acid, and sodium dioctylsulfosuccinate, are preferably included. The reactor is charged with water and a surfactant. It is preferred to charge from about 0.08% by weight to about 0.5% by weight, preferably from about 0.15% by weight to about 0.35% by weight, based on the total weight of monomers polymerized in the first and second stages, of an anionic surfactant. The combination of monomers to be polymerized in each stage may be pre-emulsified in water and 1% to 5% by weight surfactant, based on monomer weight, before being added to the reactor. The emulsion polymerization is preferably carried out in the presence of a nonionic or an anionic surfactant. Suitable surfactants include, without limitation, polyoxyethylenenonylphenyl ethers, polyoxyethylenealkylallyl ether sulfuric acid esters, amino and alkali salts of dodecylbenzenesulfonic acid such as the dimethylethanolamine salt of dodecylbenzenesulfonic acid and sodium dodecylbenzenesulfonic acid, and sodium dioctylsulfosuccinate.

In general, polymerization is carried out at temperatures from about 30° C. to about 95° C., preferably from about 50° C. to about 90° C.

A suitable initiator capable of producing free radicals is used in the polymerization. Examples of suitable initiators include, without limitation, azo compounds and peroxy compounds such as azodiisobutyronitrile, 4,4-azobis(4-cyanovaleric acid), benzoyl peroxide, lauroyl peroxide, diisopropyldicarbonate, t-butyl peroxy-2-ethylhexanoate, peroxyisopivalate, persulfate initiators such as ammonium persulfate, potassium persulfate, and sodium persulfate, and alkali metal peroxydiphosphates, in some cases in combination with reducing agents such as sodium disulfite, hydrazine, hydroxylamine and catalytic amounts of accelerators such as iron, cobalt, cerium, and vanadyl salts, preferably alkali metal or ammonium peroxydisulfates. Chain transfer agents may be added, if desired, to control molecular weight. Typical chain transfer agents include, without limitation, mercaptan compounds such as alkyl mercaptans, e.g., octyl mercaptan and dodecyl mercaptan, mercaptopropionic acid, and esters of mercaptopropionic acid. The polymerization typically proceeds by free radical polymerization. The free radical source is typically supplied by a redox initiator or by an organic peroxide or azo compound. Useful initiators include, without limitation, ammonium peroxydisulfate, potassium peroxydisulfate, sodium metabisulfite, hydrogen peroxide, t-butyl hydroperoxide, dilauryl peroxide, t-butyl peroxybenzoate, 2,2'-azobis(isobutyronitrile), and redox initiators such as ammonium peroxydisulfate and sodium metabisulfite with ferrous ammonium sulfate. Optionally, a chain transfer agent may be used. Typical chain transfer agents include mercaptans such as octyl mercaptan, n- or tert-dodecyl mercaptan, thiosalicylic acid, mercaptoacetic acid, and mercaptoethanol; halogenated compounds; and dimeric alpha-methyl styrene.

After polymerization, the acid functionality (if present) may be salted, preferably with an alkali or base, preferably an amine. Example of suitable salting materials include, without limitation, ammonia, monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine propylenediamine, ethylethanolamine, dimethylethanolamine, diethylethanolamine, 2-amino-2-methylpropanol, and morpholine. Preferred salting materials include 2-amino-2-methylpropanol and dimethylethanolamine.

The emulsion polymer typically can have weight average molecular weights of one million or more.

The theoretical glass transition temperature of the emulsion polymer can be adjusted according to methods well-known in the art through selection and apportionment of the comonomers. The preferred glass transition temperature for the emulsion polymer will depend upon the kind of automotive or industrial coating composition it will be used in. If the emulsion polymer is included in an automotive primer composition, the theoretical glass transition temperature is preferably not more than about 0° C.; in a basecoat composition, the theoretical glass transition temperature is preferably from about 0° C. to about 20° C.; and in a clearcoat composition, the theoretical glass transition temperature is preferably from about 20° C. to about 60° C. A two-stage polymer gives further opportunity to customize the emulsion polymer to the particular type of coating composition in which it will be used.

The automotive coating compositions of the present invention preferably also include a crosslinker component. The crosslinker component includes one or more crosslinkers reactive with the active hydrogen functionality or other crosslinkable functionality of the emulsion polymer. Examples of crosslinkers reactive with active hydrogen functionality include, without limitation, materials having active methylol or methylalkoxy groups, including aminoplast resins or phenol/formaldehyde adducts; blocked polyisocyanate curing agents; tris(alkoxy carbonylamino) triazines; with acid groups, curing agents with oxirane functionality; and combinations thereof. Suitable aminoplast resins are amine/aldehyde condensates, preferably at least partially etherified, and most preferably fully etherified. Melamine and urea are preferred amines, but other triazines, triazoles, diazines, guanidines, or guanamines may also be used to prepare the alkylated amine/aldehyde aminoplast resins crosslinking agents. The aminoplast resins are preferably amine/formaldehyde condensates, although other aldehydes, such as acetaldehyde, crotonaldehyde, and benzaldehyde, may be used. Non-limiting examples of preferred aminoplast resins include monomeric or polymeric melamine formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like. Monomeric melamine formaldehyde resins are particularly preferred. The preferred alkylated melamine formaldehyde resins are water miscible or water soluble. Examples of blocked polyisocyanates include isocyanurates of toluene diisocyanate, isophorone diisocyanate, and hexamethylene diisocyanate blocked with a blocking agent such as an alcohol, an oxime, or a secondary amine such as pyrazole or substituted pyrazole.

The crosslinker component preferably is from about 2% by weight to about 30% by weight, and more preferably from about 5% by weight to about 20% by weight, and particularly preferably about 5% to about 15% by weight of the combined nonvolatile weights of the film-forming components, including the emulsion polymer, the crosslinking component, and any other film-forming polymer or resin.

The compositions may include one or more catalysts to enhance the cure reaction. The type of catalyst depends upon the particular crosslinker component composition utilized. For example, when aminoplast compounds, especially monomeric melamines, are used as a curing agent, a strong acid catalyst, typically blocked with an amine, may be utilized to enhance the cure reaction. Useful catalysts include, without limitation, blocked acid catalysts, such as para-toluene sulfonic acid, dodecylbenzene sulfonic acid, and dinonylnaphthylene disulfonic acid blocked with amines; phenyl acid phosphate, monobutyl maleate, and butyl phosphate, hydroxy phosphate ester; Lewis acids, zinc salts, and tin salts, including dibutyl tin dilaurate and dibutyl tin oxide.

The coating compositions according to the invention may further include pigments such as are commonly used in the art, including organic and inorganic color pigments, metallic or other inorganic flake materials such as pearlescent mica flake pigments or metallic flake pigments such as aluminum flak pigments, corrosion inhibiting pigments, and conductive pigments, as well as fillers. Illustrative examples of these are metal oxides, chromates, molybdates, phosphates, and silicates, carbon black, titanium dioxide, sulfates, and silicas. The amount of pigment may vary widely depending upon the desired color and the specific pigments used, e.g. a pigment-to-solid binder ratio of 0.01 to 2.

Other conventional materials, such as dyes, flow control or rheology control agents, stabilizers, wetting agents, dispersing agents, adhesion promoters, UV absorbers, hindered amine light stabilizers, etc. may be incorporated into the coating composition. While such additives are well-known in the prior art, the amount used must be controlled to avoid adversely affecting the coating characteristics.

The coating composition has a very low content of volatile organic solvent, and is preferably a solvent free or substantially solvent free dispersion. By "substantially solvent free" it is meant that the dispersion has a volatile organic content of less than about 5% by weight of the coating composition. The coating composition preferably has a volatile organic content of less than about 1.5, more preferably less than about 1.3, and even more preferably less than about 0.7. The volatile organic content of a coating composition is typically measured using ASTM D3960.

The coating compositions of the invention are preferably formulated as thermosetting automotive or industrial coatings. The coating composition can be formulated as electrodeposition primer, primer surfacer, basecoat, or clearcoat compositions Coating compositions can be coated on the article by any of a number of techniques well-known in the art. These include, for example, spray coating, dip coating, roll coating, curtain coating, and the like. For automotive body panels, spray coating is preferred.

The automotive or industrial coating compositions of the present invention can be applied over substrates including metals, plastic, and elastomers. The compositions may be formulated as primers for automotive articles, such as metal or plastic automotive bodies or elastomeric fascia. When the article is a metallic article, it is preferred to have a layer of electrocoat primer before application of the primer coating composition of the invention.

In a preferred embodiment, the primer composition further includes a polyurethane dispersion. The polyurethane polymer of the dispersion preferably has a glass transition temperature of about 0° C. or less, preferably about −20° C. or less, and more preferably about −30° C. or less. The glass transition temperature of the polyurethane is in the range of from about −80° C. to about 0° C., more preferably from about −65° C. to about −10° C., still more preferably from about −65° C. to about −30° C., and even still more preferably from about −60° C. to about −35° C.

The weight average molecular weight of the polyurethane is preferably from about 15,000 to about 60,000, more preferably from about 15,000 to about 60,000, and even more preferably from about 20,000 to about 35,000.

Polyurethanes are prepared by reaction of at least one polyisocyanate and at least one polyol. The reactants used to prepare the polyurethane are selected and apportioned to provide the desired glass transition temperature. Suitable polyisocyanates include, without limitation, aliphatic linear and cyclic polyisocyanates, preferably having up to 18 carbon atoms, and substituted and unsubstituted aromatic polyisocyanates. Illustrative examples include, without limitation, ethylene diisocyanate, 1,2-diisocyanatopropane, 1,3-diisocyanatopropane, 1,4-butylene diisocyanate, lysine diisocyanate, 1,4-methylene bis(cyclohexyl isocyanate), isophorone diisocyanate, toluene diisocyanates (e.g., 2,4-toluene diisocyanate and 2,6-toluene diisocyanate) diphenylmethane 4,4'-diisocyanate, methylenebis-4,4'-isocyanatocyclohexane, 1,6-hexamethylene diisocyanate, p-phenylene diisocyanate, tetramethyl xylene diisocyanate, meta-xylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, and combinations of two or more of these. Biurets, allophonates, isocyanurates, carbodiimides, and other such modifications of these isocyanates can also be used as the polyisocyanates. In a preferred embodiment, the polyisocyanates include methylenebis-4,4'-isocyanatocyclohexane, 1,6-hexamethylene diisocyanate, 1,12-dodecamethylene diisocyanate, and combinations thereof. It is particularly preferred to use at least one α,ω-alkylene diisocyanate having four or more carbons, preferably 6 or more carbons, in the alkylene group. Combinations of two or more polyisocyanates in which one of the polyisocyanates is 1,6-hexamethylene diisocyanate are especially preferred.

The polyol or polyols used to prepare the polyurethane polymer can be selected from any of the polyols known to be useful in preparing polyurethanes, including, without limitation, 1,4-butanediol, 1,3-butanediol, 2,3-butanediol, 1,6-hexanediol, neopentyl glycol, 1,3-propanediol, 1,5-pentanediol, 1,6-hexanediol, 1,9-nonanediol, ethylene glycol, diethylene glycol, triethylene glycol and tetraethylene glycol, propylene glycol, dipropylene glycol, glycerol, cyclohexanedimethanols, 2-methyl-2-ethyl-1,3-propanediol, 2-ethyl-1,3-hexanediol, thiodiglycol, 2,2,4-trimethyl-1,3-pentanediol, cyclohexanediols, trimethylolpropane, trimethylolethane, and glycerin; polyester polyols such as the reaction products of any of the foregoing alcohols and combinations thereof with one or more polycarboxylic acids selected from malonic acid, maleic acid, succinic acid, glutaric acid adipic acid, azelaic acid, anhydrides thereof, and combinations thereof; polyether polyols, such as polyethylene glycols and polypropylene glycols; and combinations of such polyols. Polyols having two hydroxyl groups are preferred. The polyurethane is preferably prepared using one or more polyester polyols. In a preferred embodiment, the polyester polyol is the reaction product of a mixture that comprises neopentyl glycol and adipic acid.

While it is possible to prepare a nonionic dispersion of the polyurethane, the polyurethane dispersion is preferably anionic. Acid-functional polyurethanes that can be salted to form anionic dispersions or emulsions may be synthesized by including a monomer having acid functionality, such as, without limitation, dialkylpropionic acids including dimethylolpropionic acid, and alkali metal salts of amino acids such as taurine, methyl taurine, 6-amino caproic acid, glycine, sulfanilic acid, diamino benzoic acid, ornithine, lysine and 1:1 adducts of sultones, such as propane sultone or butane sultone, with diamines, such as ethylene diamine, hydrazine, or 1,6-hexamethylene diamine. The hydroxyl groups react to form the urethane linkages while the acid group remains unreacted in the polyurethane polymerization.

Suitable polyurethane polymers can be prepared by any of the known methods. In one method for preparing polyurethane polymers, the polyisocyanate component is reacted with an excess of equivalents of the polyol component to form a hydroxyl-functional polyurethane polymer. Alternatively, an excess of equivalents of the polyisocyanate component can be reacted with the polyol component to form an isocyanate-functional prepolymer. The prepolymer can then be reacted further in different ways. First, the prepolymer can be reacted with a mono-functional alcohol or amine to provide a non-functional polyurethane polymer. Examples of mono-functional alcohols and amines that may be used include polyethylene oxide compounds having one terminal hydroxyl group, lower mono-functional alcohols having up to 12 carbon atoms, amino alcohols such as dimethylethanolamine, and secondary amines such as diethylamine and dimethylamine. Secondly, the prepolymer can be reacted with a polyfunctional polyol, polyamine, or amino alcohol compound to provide reactive hydrogen functionality. Examples of such polyfunctional compounds include, without limitation, the polyols already mentioned above, including triols such as trimethylolpropane; polyamines such as ethylenediamine, butylamine, and propylamine; and amino alcohols, such as diethanolamine. Finally, the prepolymer can be chain extended by the water during emulsification or dispersion of the prepolymer in the aqueous medium. The prepolymer is mixed with the water after or during neutralization.

The polyurethane may be polymerized without solvent. Solvent may be included, however, if necessary, when the polyurethane or prepolymer product is of a high viscosity. If solvent is used, the solvent may be removed, partially or completely, by distillation, preferably after the polyurethane is dispersed in the water. The polyurethane may have nonionic hydrophilic groups, such as polyethylene oxide groups, that serve to stabilize the dispersed polyurethane polymer. In a preferred embodiment, however, the polyurethane polymer is prepared with pendant acid groups as described above, and the acid groups are partially or fully salted with an alkali, such as sodium or potassium, or with a base, such as an amine, before or during dispersion of the polyurethane polymer or prepolymer in water.

The primer coating composition of the invention is applied directly to the substrate or over one or more other layers of primer, such as the electrocoat primer. The applied primer coating composition is then cured to form a primer coating layer. The electrocoat primer or other first layer of primer may be cured at the same time as the primer coating layer of the invention in a process known as "wet-on-wet" coating. The primer coating layer formed from the primer coating composition of the invention is the outermost primer layer of the composite coating.

A topcoat composition is applied over the primer coating layer and cured to form a topcoat layer. The substrate at that point is then covered with a composite coating that has at least one layer of primer coating derived from the inventive compositions and at least one layer of topcoat. In a preferred embodiment, the coating composition of the present invention is overcoated with a topcoat applied as a color-plus-clear (basecoat-clearcoat) topcoat. In a basecoat-clearcoat topcoat, an underlayer of a pigmented coating, the basecoat, is covered with an outer layer of a transparent coating, the clearcoat. Basecoat-clearcoat topcoats provide an attractive smooth and glossy finish and generally improved performance.

Crosslinking compositions are preferred as the topcoat layer or layers. Coatings of this type are well-known in the art and include waterborne compositions as well as solventborne compositions. For example, the topcoat may be a clearcoat according to U.S. Pat. No. 5,474,811, applied wet-on-wet over a layer of a basecoat composition. Polymers known in the art to be useful in basecoat and clearcoat compositions include, without limitation, acrylics, vinyl, polyurethanes, polycarbonates, polyesters, alkyds, and polysiloxanes. Acrylics and polyurethanes are preferred. Thermoset basecoat and clearcoat compositions are also preferred, and, to that end, preferred polymers comprise one or more kinds of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin of the kind described above. In one embodiment, waterborne basecoat compositions and/or clearcoat compositions having low volatile organic content are used. The waterborne basecoat and waterborne clearcoat compositions each preferably has a volatile organic content of less than about 1.5, more preferably less than about 1.3, and even more preferably less than about 0.7.

When the coating composition according to the invention is used as the basecoat of a composite basecoat-clearcoat coating, the basecoat coating is typically applied over one or more layers of primer coating, which are preferably cured before the basecoat is applied. A clearcoat composition is then applied over the basecoat, typically before the basecoat is cured in what is generally known as a "wet-on-wet" application, with the basecoat and clearcoat being cured at the same time. The clearcoat composition may any of a number of types well-known in the art, including. Polymers known in the art to be useful in clearcoat compositions include acrylics, vinyls, polyurethanes, polycarbonates, polyesters, alkyds, and polysiloxanes. Preferred polymers include acrylics and polyurethanes. Clearcoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups. Clearcoat compositions are preferably thermosetting and include one or more suitable crosslinkers, such as those already mentioned.

Each layer of the composite coatings of the invention can be applied to an article to be coated according to any of a number of techniques well-known in the art. These include, for example, spray coating, dip coating, roll coating, curtain coating, and the like. If an initial electrocoat primer layer is applied to a metallic substrate, the electrocoat primer is applied by electrodeposition. For automotive applications, the primer coating composition of the invention and the topcoat layer or layers are preferably applied by spray coating, particularly electrostatic spray methods. Coating layers of one mil or more are usually applied in two or more coats, separated by a time sufficient to allow some of the solvent or aqueous medium to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

The outermost primer layer, which is formed by reacting the primer compositions of the invention, may be cured by reaction of curing component with at least one the polyurethane resin or the acrylic resin. before the topcoat is applied. The cured primer layer may be from about 0.5 mil to about 2 mils thick, preferably from about 0.8 mils to about 1.2 mils thick.

Color-plus-clear topcoats are usually applied wet-on-wet. The compositions are applied in coats separated by a flash, as described above, with a flash also between the last coat of the color composition and the first coat the clear. The two coating layers are then cured simultaneously. Preferably, the cured basecoat layer is 0.5 to 1.5 mils thick, and the cured clear coat layer is 1 to 3 mils, more preferably 1.6 to 2.2 mils, thick.

Alternatively the primer layer of the invention and the topcoat can be applied "wet-on-wet." For example, the primer composition of the invention can be applied, then the applied layer flashed; then the topcoat can be applied and flashed; then the primer and the topcoat can be cured at the same time. Again, the topcoat can include a basecoat layer and a clearcoat layer applied wet-on-wet.

The coating compositions described herein are preferably subjected to conditions so as to cure the coating layers. The coating compositions described are preferably cured with heat. Curing temperatures are preferably from about 70° C. to about 180° C., and particularly preferably from about 170° F. to about 200° F. for a composition including an unblocked acid catalyst, or from about 240° F. to about 275° F. for a composition including a blocked acid catalyst. Typical curing times at these temperatures range from 15 to 60 minutes, and preferably the temperature is chosen to allow a cure time of from about 15 to about 30 minutes. In a preferred embodiment, the coated article is an automotive body or part.

The invention is further described in the following examples. The examples are merely illustrative and do not in any way limit the scope of the invention as described and claimed. All parts are by weight unless otherwise indicated.

EXAMPLES

Preparation of Monomer

An addition polymerizable monomer was prepared by charging to a suitable reactor 400 parts by weight Cardura E10 (glycidyl ester of neodecanoic acid, available from Shell Chemicals), 115.3 parts by weight acrylic acid, 0.28 parts by weight DABCO T9 catalyst (available from Air Products), and 0.148 parts by weight 4-methoxyphenol. The charge was slowly heated under an air flow with stirring to about 80° C. After an exotherm, the temperature of the reaction mixture was increased to about 100° C. until the exotherm stabilized. Maintaining the temperature at about 100° C., a mixture of an additional 400 parts by weight Cardura E10 (available from Shell Chemicals), 115.3 parts by weight acrylic acid, 0.28 parts by weight DABCO T9 catalyst (available from Air Products), and 0.148 parts by weight 4-methoxyphenol was added over 2 hours.

Example 1

A reactor is charged with 28.78 parts by weight of deionized water, which is heated to 82° C. under a nitrogen and with stirring. A mixture of 24.14 parts by weight of deionized water, 3.99 parts by weight of ABEX EP 110 (anionic surfactant available from Rhodia), 2 parts by weight of the reaction product of acrylic acid and the glycidyl ester of neodecanoic acid prepared above, 11.4 parts by weight of methyl methacrylate, 3.2 parts by weight of butyl acrylate, 10.2 parts by weight of hydroxyethyl methacrylate, 1.2 parts by weight of acrylic acid, 12 parts by weight of methyl acrylate, 0.12 parts by weight of ammonium persulfate, and 0.4 parts by weight of octanethiol was added to the reactor over a period of three hours. The reaction temperature was maintained at 82° C. for an additional 2 hours. The product emulsion polymer was then cooled and 1.97 parts of deionized water was added.

Example 2

Example 2 was prepared in the same way as Example 1, except that the amount of the reaction product of acrylic acid and the glycidyl ester of neodecanoic acid was increased to 4 parts by weight and the amount of butyl acrylate was decreased to 1.2 parts by weight in the monomer mixture.

Example 3

Example 3 was prepared in the same way as Example 1, except that the amount of the reaction product of acrylic acid and the glycidyl ester of neodecanoic acid was increased to 8 parts by weight, the amount of butyl acrylate was decreased to 1.2 parts by weight, and the amount of methyl methacrylate was decreased to 7.4 parts by weight in the monomer mixture.

Comparative Example A

A comparative acrylic polymer was prepared in the same way as Example 1, except that the entire amount of the reaction product of acrylic acid and the glycidyl ester of neodecanoic acid was replace by butyl acrylate.

Example 4

The polymers of Examples 1–3 and Comparative Example A were formulated into automotive primer compositions and tested for chip resistance. To prepare the primer compositions, 17.51 parts by weight of BAYHYDROL 140 AQ polyurethane dispersion (about 40% nonvolatile, 59% water, and 1% toluene, glass transition temperature of about −45° C., pH of about 6.0 to about 7.5, weight average molecular weight of about 25,000, anionic Desmodur W/1,6-hexamethylene diisocyanate/polyester polyol-based polyurethane, available from Bayer Corporation, Pittsburgh, Pa.), 16.27 parts by weight of one of the emulsion polymers of Examples 1–3 or Comparative Example A, 20.9 parts deionized water, and 40.89 parts by weight of pigment paste (63% by weight nonvolatile in water, nonvolatiles are 33.1% by weight of BAYHYDROL 140 AQ polyurethane resin, 33.1% by weight of titanium dioxide, 33.1% by weight of barium sulfate extender, and the balance carbon black, ground on a horizontal mill to a fineness of 6 microns). To this mixture were added 2.71 parts by weight of RESIMENE 747 (a melamine formaldehyde resin available from Solutia, St. Louis, Mo.) and 0.27 parts by weight of ABEX EP 110 (anionic surfactant available from Rhodia). A total of 1.39 parts by weight of an additive package (defoamer, wetting agent, and thickener) was then added. Finally, the pH of the primer composition was adjusted to about 8.0 with 2-amino-2-methylpropanol.

The primer compositions made with the polymer emulsions of Examples 1–3 and Example A were applied to electrocoat primed 4"×12" steel panels and cured according to the bake schedule shown in the table below to form a primer layer of about 1 mil thickness. The cured primer was then topcoated with commercial basecoat and clearcoat compositions. The panels were then subjected to gravelometer testing according to the test procedure of SAE J400. Briefly, in the SAE J400 procedure, the panels are cooled to −20 centigrade for 1 hour prior to the gravel test. The panel is positioned in a gravelometer machine in an upright position, 90 degrees from path of gravel. One pint of gravel is blown onto the panel with an air pressure of 70 psi. The panel is then warmed to room temperature, tape pulled with 3M 898 strapping tape, and rated according to chip rating standards on a scale of 0 to 9, with 0 corresponding to a standard having total delamination of the coating and 9 corresponding to a standard having almost no chips. The gravelometer ratings for the panels obtained using the compositions made with the polymer emulsions of Examples 1–3 and Comparative Example A are shown in the following table.

| Acrylic Emulsion Polymer in Primer | 15 Minutes at 275° F. Bake | 30 Minutes at 325° F. Bake |
|---|---|---|
| Example 1 | 8− | 8 |
| Example 2 | 8− | 8− |
| Example 3 | 7 | 8 |
| Comparative Example A | 6 | 6 |

Example 5

A two-stage emulsion polymer was prepared using the acrylic acid-glycidyl ester of neodecanoic acid monomer prepared according to the preparation given above.

A reactor was charged with 600 parts by weight of deionized water and 20 parts by weight of ABEX EP 110 (anionic surfactant available from Rhodia), which was heated to 82° C. under a nitrogen and with stirring. A mixture of 347 parts by weight of deionized water, 60 parts by weight of ABEX EP 110, 1.2 parts by weight of ammonium persulfate, 252 parts by weight of the reaction product of acrylic acid and the glycidyl ester of neodecanoic acid prepared above, 212 parts by weight of methyl methacrylate, and 15.8 parts by weight of hydroxyethyl methacrylate were mixed under low agitation for 30 minutes and then added to the reactor over 90 minutes. The monomer addition line was cleaned by adding 15.01 parts by weight deionized water. Next, a mixture of 118 parts by weight of butyl acrylate, 138 parts by weight of methyl methacrylate, 48.2 parts by weight of hydroxyethyl methacrylate, 16 parts by weight of methacrylic acid, 112.45 parts by weight of deionized water, and 0.2 parts by weight of ammonium persulfate was added over 90 minutes. The add line was flushed with 22.27 parts by weight deionized water. The reaction mixture was held at 82° C. for an additional hour, then cooled and neutralized with 21.7 parts by weight of 2-amino-2-methylpropanol.

Example 6

A two-stage emulsion polymer was prepared according to the procedure of Example 5, except that the amount of butyl acrylate was decreased to 82 parts by weight and the amount of methyl methacrylate in the second mixture added was increased to 138 parts by weight.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An emulsion polymer comprising monomer units derived from an addition polymerizable ester of a glycidyl ester of a tertiary acid having 9 or more carbon atoms or a mixture of such acids, wherein such monomer units are present at up to about 20% by weight of the emulsion polymer, and further wherein the emulsion polymer is a two-stage emulsion polymer and the monomer units derived from an addition polymerizable ester of a glycidyl ester of a tertiary acid having 9 or more carbon atoms or a mixture of such acids are present in only one stage.

2. An emulsion polymer according to claim 1, wherein said monomer units are derived from an addition polymerizable ester of a glycidyl ester of a tertiary acid has up to 18 carbon atoms or a mixture of such acids.

3. An emulsion polymer according to claim 1, wherein said monomer units are derived from an addition polymerizable ester of a glycidyl ester of a tertiary acid having 9 to 11 carbon atoms or a mixture of such acids.

4. An emulsion polymer according to claim 1, wherein said monomer units are acrylic esters of a glycidyl ester of a tertiary acid having 9 to 11 carbon atoms or a mixture of such acids.

5. An emulsion polymer according to claim 1, wherein said monomer units are methacrylic esters of a glycidyl ester of a tertiary acid having 9 to 11 carbon atoms or a mixture of such acids.

6. An emulsion polymer according to claim 1, wherein said monomer units have a formula:

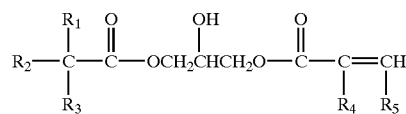

in which $R_1$, $R_2$, and $R_3$ are alkyl groups, at least one of which is methyl, having a total of at least 8 carbon atoms and $R_4$ and $R_5$ are either both H or one of $R_4$ and $R_5$ is a methyl group and the other is H.

7. An aqueous coating composition comprising an emulsion polymer comprising monomer units derived from an addition polymerizable ester of a glycidyl ester of a tertiary acid having 9 or more carbon atoms or a mixture of such acids, wherein such monomer units are present at up to about 20% by weight of the emulsion polymer wherein the emulsion polymer is a two-stage emulsion polymer and the monomer units derived from an addition polymerizable ester of a tertiary acid having 9 or more carbon atoms or a mixture of such acids are present in only one stage.

8. A coating composition according to claim 7, wherein said monomer units have a formula:

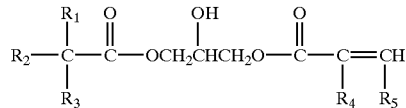

in which $R_1$, $R_2$, and $R_3$ are alkyl groups, at least one of which is methyl, having a total of at least 8 carbon atoms and $R_4$ and $R_5$ are either both H or one of $R_4$ and $R_5$ is a methyl group and the other is H.

9. A coating composition according to claim 7, further including a dispersed polyurethane polymer, said polyurethane polymer having a glass transition temperature of about 0° C. or less.

10. A method of preparing a coating composition, including emulsion polymerizing a mixture of addition polymerizable monomers, wherein said mixture includes at least a monomer having a formula:

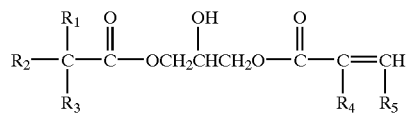

in which $R_1$, $R_2$, and $R_3$ are alkyl groups, at least one of which is methyl, having a total of at least 8 carbon atoms and $R_4$ and $R_5$ are either both H or one of $R_4$ and $R_5$ is a methyl group and the other is H and a monomer having active hydrogen functionality to produce an emulsion polymer wherein the emulsion polymer is a two-stage emulsion polymer and the monomer units derived from an addition polymerizable ester of a glycidyl ester of a tertiary acid having 9 or more carbon atoms or a mixture of such acids are present in only one stage; and combining the emulsion polymer with one or more further materials including at least a crosslinker reactive with active hydrogen functionality.

11. An aqueous coating composition according to claim 7, wherein said coating composition is a primer coating composition.

* * * * *